US005829568A

United States Patent [19]

Bhandari et al.

[11] Patent Number: 5,829,568

[45] Date of Patent: Nov. 3, 1998

[54] SAFETY CLAMP

[75] Inventors: Ajay K. Bhandari; Tim Kreja, both of Westlake; Thomas W. Glissman, Avon, all of Ohio; Clayton E. Bossert, Montgomery, Ill.

[73] Assignee: Pines Manufacturing, Westlake, Ohio

[21] Appl. No.: 857,737

[22] Filed: May 16, 1997

[51] Int. Cl.$^{6}$ .................................. B21D 55/00; F16P 3/12

[52] U.S. Cl. .......................................... 192/130; 192/129 A

[58] Field of Search .............................. 192/129 R, 129 A, 192/130; 269/227; 72/149

[56] References Cited

U.S. PATENT DOCUMENTS

| | | | |
|---|---|---|---|
| 2,311,441 | 2/1943 | James | 192/130 |
| 2,694,820 | 11/1954 | Fitzgerald et al. | 192/130 X |
| 2,745,303 | 5/1956 | Cornelius . | |
| 3,218,058 | 11/1965 | Smith . | |
| 4,691,553 | 9/1987 | Barber | 192/130 X |
| 4,694,671 | 9/1987 | Downham | 192/130 X |
| 4,848,723 | 7/1989 | Borzym . | |
| 5,056,766 | 10/1991 | Engibarov . | |

*Primary Examiner*—Richard M. Lorence
*Attorney, Agent, or Firm*—Pearne, Gordon, McCoy & Granger LLP

[57] ABSTRACT

A tube bending machine having a rotatable bend die, a pressure die, a clamp die, an actuator and a controller. A clamp assembly holds the clamp die and includes a base, a clamp die holder which is spring biased away from and slideably engageable with the base. A spacer is also attached to the base and is moveable between positions. A gear rotatably mounted to the base is attached to a first and second cam by a shaft and the gear moves on a rack. The first cam is followed by a cam follower which moves to allow the spacer to change positions. The clamp die holder may move toward the housing in case the clamp die engages an obstruction, thus avoiding damage or injury to the obstruction. A second position of the spacer substantially blocks the space between the clamp die holder and the base, thus making a substantially rigid connection between them. The second position is used during the tube bending process. A microswitch senses the clamp die holder position and stops or opens the clamp die holder assembly if an obstruction is present. A set up mode is also provided by disengaging the gear from the rack and moving the spacer to the second position.

9 Claims, 4 Drawing Sheets

SAFETY CLAMP

BACKGROUND OF THE INVENTION

Injuries to workers on industrial machines are common, tragic and often permanent. There are particular dangers to workers who have to place a workpiece in a machine. Any mistake or inattention may result in the loss of a finger or hand. When a workpiece is clamped prior to the work on it, the clamping device is a constant threat. The worker has to put his fingers in a danger zone and them remove them before danger arrives every time the workpiece is located in the machine. Every serious mistake is a tragedy. This is true in tube bending machines and many other pieces of equipment.

A clamping die may hold a tube in a tube bending machine with hundreds or thousands of pounds of force. This magnitude of compression can easily crush human fingers. There are various types of safety equipment but most of them depend on attachment to the operator's hand or wrist to shut off the machine rather than a safety device on the machine itself. Failure to attach the safety devices is a common problem because it depends on the operator.

The safety clamp of this invention has the significant advantage of being integral with the machine. Furthermore, it has both a mechanical and electrical safeguard to prevent an operator's hand from being caught in a clamping motion. A unique feature of this invention is that the clamp will not complete its motion if an obstruction, such as a finger, is met during the closing motion. The protection is not dependent on human action or inaction. This invention protects even the most negligent operator and prevents injury under all conditions.

This invention includes a moveable or resilient member as part of a clamp that moves when an obstruction is met and blocks the final hard clamping action. A microswitch also senses the position of the clamp and stops operation of the machine if an obstruction is met. By using a moveable spacer between the workpiece holder and its housing, a "soft clamp" is built into the machine. Only when there is no obstruction does the spacer move into its final position to form the rigid clamp necessary to hold the workpiece during operation on it. This invention has particular use in tube bending machines but is adaptable to many other devices.

BRIEF SUMMARY OF THE INVENTION

A workpiece clamp assembly which will not fully engage if an obstruction is in the closure path. A base holds the workpiece holder of the clamp assembly, is spaced therefrom and is moveable relative to it. A spacer is moveable between positions. A first position of the spacer allows the workpiece holder to move toward the base in case an obstruction is met thus leaving room for the obstruction without crushing it. A second position of the spacer substantially blocks the space between the workpiece holder and the base thus making a substantially rigid connection between them.

DETAILED DESCRIPTION OF THE INVENTION

Figure 1:
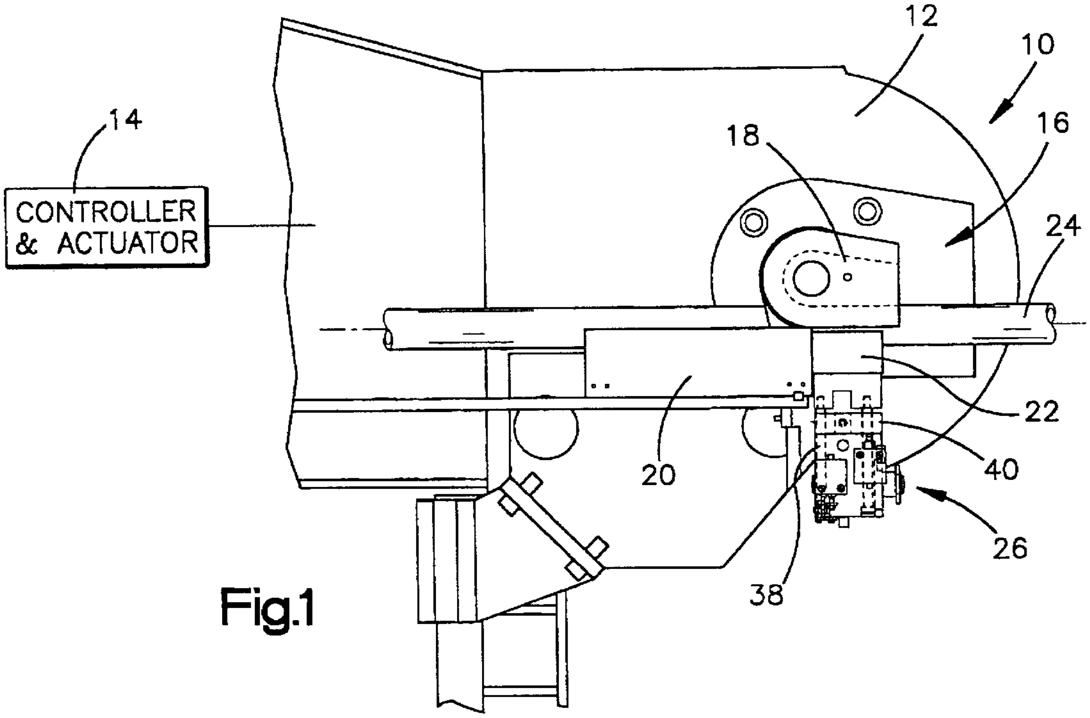
FIG. 1 is a top view of a tube bender utilizing this invention.

A tube bending machine 10 as shown in FIG. 1 includes a base 12, a controller and actuator 14 and a bending mechanism 16. The controller and actuator 14 may be any one of many mechanisms which are known in the art. For example, U.S. Pat. Nos. 5,617,753 and 4,765,118 describe such a controller and actuator and these patents are hereby incorporated by reference in their entirety.

The bending mechanism 16 includes a bend die 18, pressure die 20 and a clamp die 22. They hold a tube 24 which is to be bent. The operation of the bend die 18, pressure die 20 and clamp die 22 in holding and bending the tube can be done in many ways known in the art, some of which are described in the above-noted patents.

The clamp die 22 (FIGS. 1, 2, 3 and 3A) is held by a clamp assembly 26 which hold the clamp die 22. The clamp assembly 26 includes a clamp die holder 28 which may, in general, be any workpiece holder in any kind of machine. In this situation, the clamp die holder has shaped grooves 30 and 32 formed by irregular shaped walls 34 and 36 to form top, bottom and side supports for the clamp die. The clamp die has complementary "T" shaped rails (not shown) on the clamp die 22 which slide into the grooves 30 and 32 and are held securely and firmly therein. Any shape grooves and rails or other mechanism for securing the clamp die holder 28 and clamp die 22 may be used and will be known to one skilled in the art.

A base 38 is spaced from the clamp die holder 28 by a spacer 40. The term "base" is used to mean anything to attach the parts herein. The base 38 has a pair of shafts, holes or tunnels 42 and 44 which pass through its length. Rods 46 and 48 pass through the holes 42 and 44 and are slideably engaged therewith. The rods 46 and 48 may be any appropriate shape and material and may be simple bolts having heads 50 and 52 which fit into expanded portions 54 and 56 of holes 42 and 44. The ends 58 and 60 of rods 46 and 48 are secured to the clamp die holder 28 by such means as threads, a press fit or various other devices. There may be more or less than two rods but two rods have been found to work well. Spring 59 and 61 fits over the rods 46 and 48 and bias the clamp die holder 28 away from the base 38 by pressing against abutments on both of them.

Figure 3:
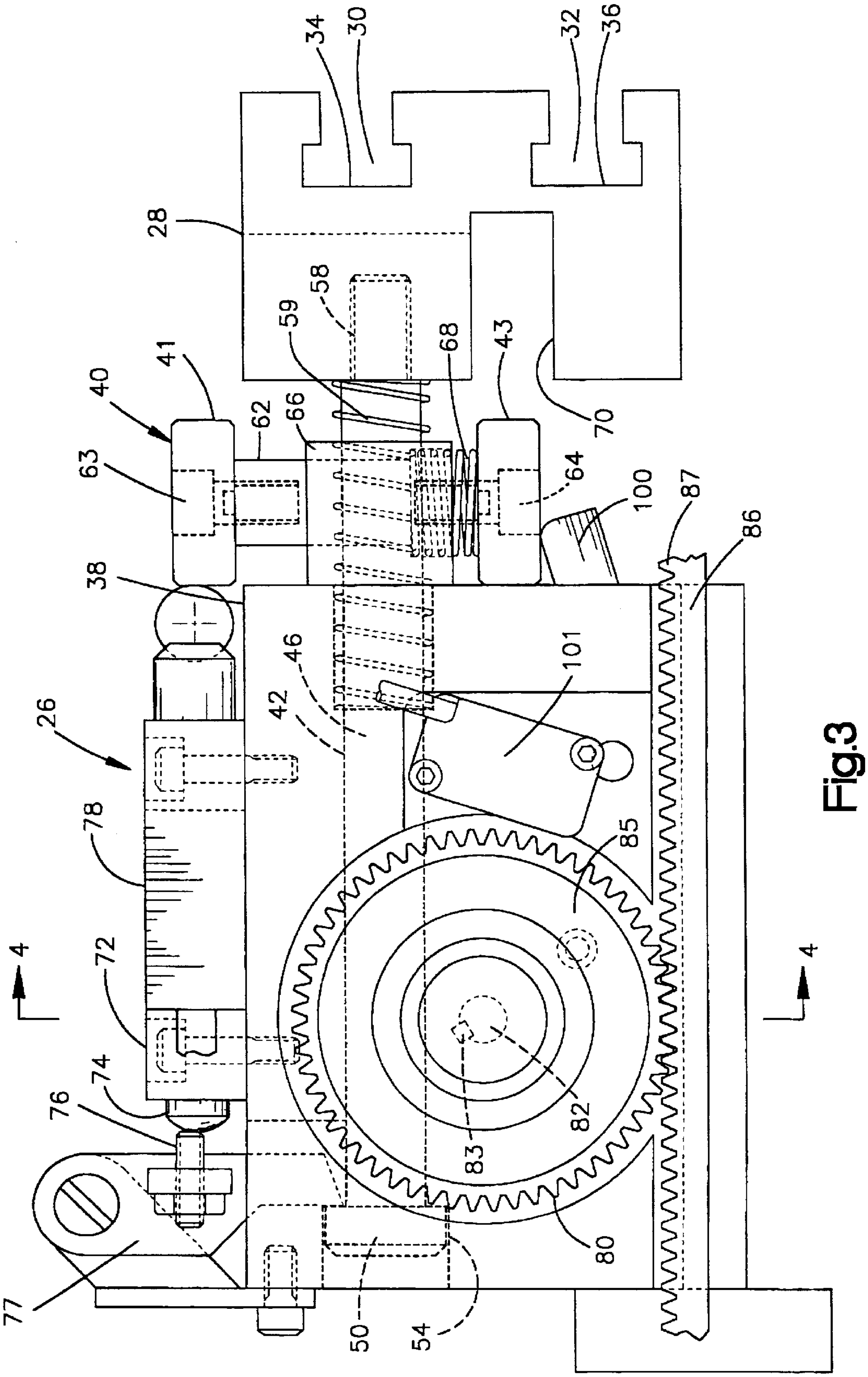
FIG. 3 is a side view of the clamp assembly of FIG. 2 in a first position.
Figure 3A:
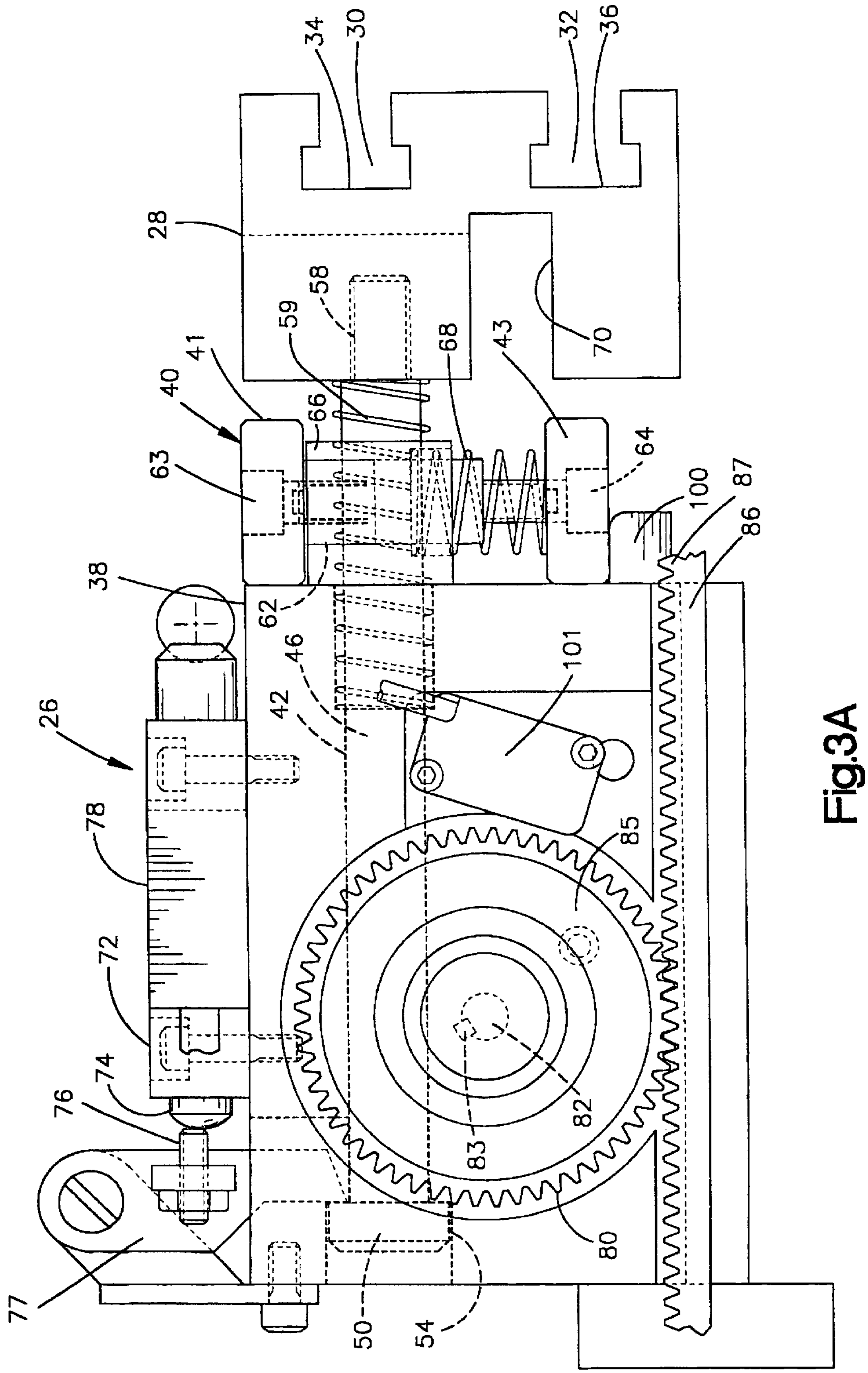
FIG. 3A is a side view of the clamp assembly of FIG. 2 in a second position.
Figure 5:
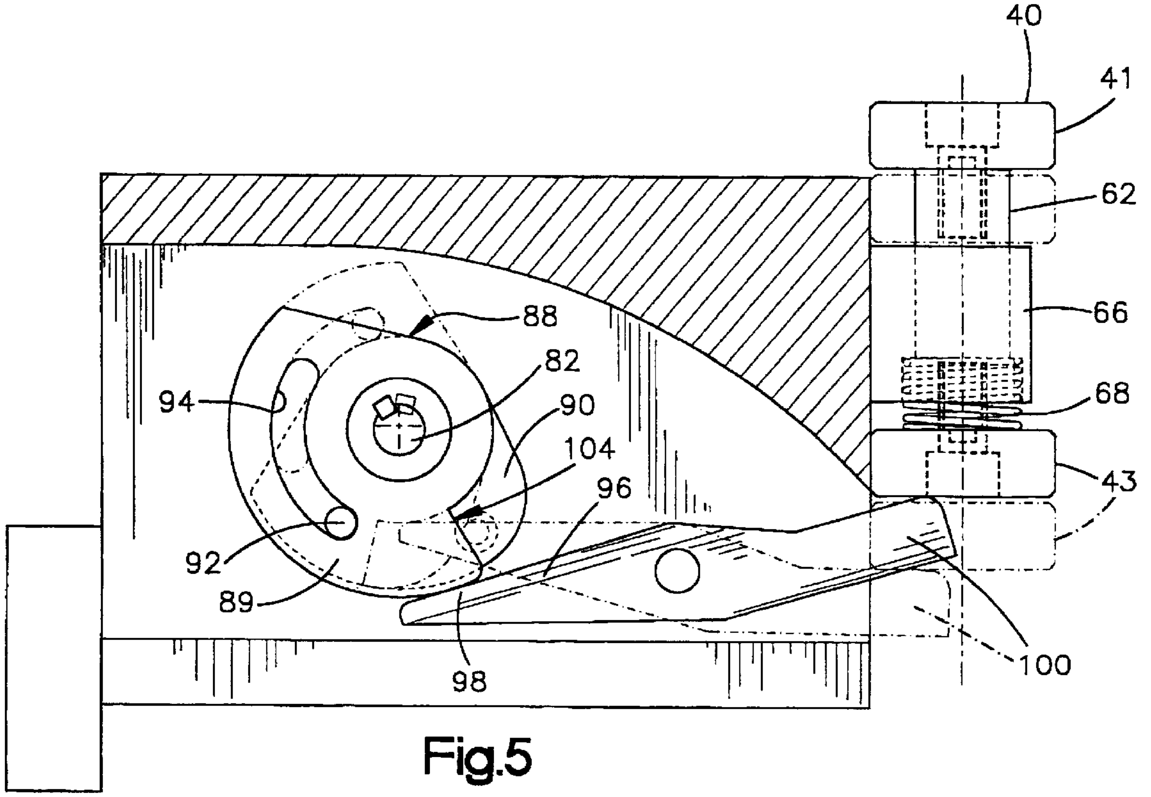
Fig. 5 is a partial side view of a moveable spacer and a partial cross-sectional view of its operating mechanism.

The spacer 40 may have any appropriate shape. It is necessary, however, that it is formed and placed in such a manner that it moves between different positions (FIGS. 3, 3A and 5). In a first position, it must allow the clamp die holder 28 to move toward the base 38. In a second position (FIG. 3A and dotted in FIG. 5), it must block the clamp die holder from moving toward the base 38. In the preferred embodiment described herein, the spacer 40 has end pieces 41 and 43 separated by a bar 62. Fasteners 63 and 64 connect the ends 41 and 43 with the rod 62. An extension 66 from the base 38 having an opening therein fits around the bar 62 and allows the spacer 40 to move up and down therein. A spring 68 fits around the bar 62 and its ends engage the spacer end piece 43 and extension 66 thus biasing the spacer 40 downwardly. A channel 70 (FIG. 3 and 3A) formed on the back of the clamp die holder is larger than the end piece 43 and will fit around it if the clamp die holder moves toward the housing 26. Other biasing devices and mechanisms will be obvious to move the spacer 40 into and out of the first and second positions.

Figure 2:
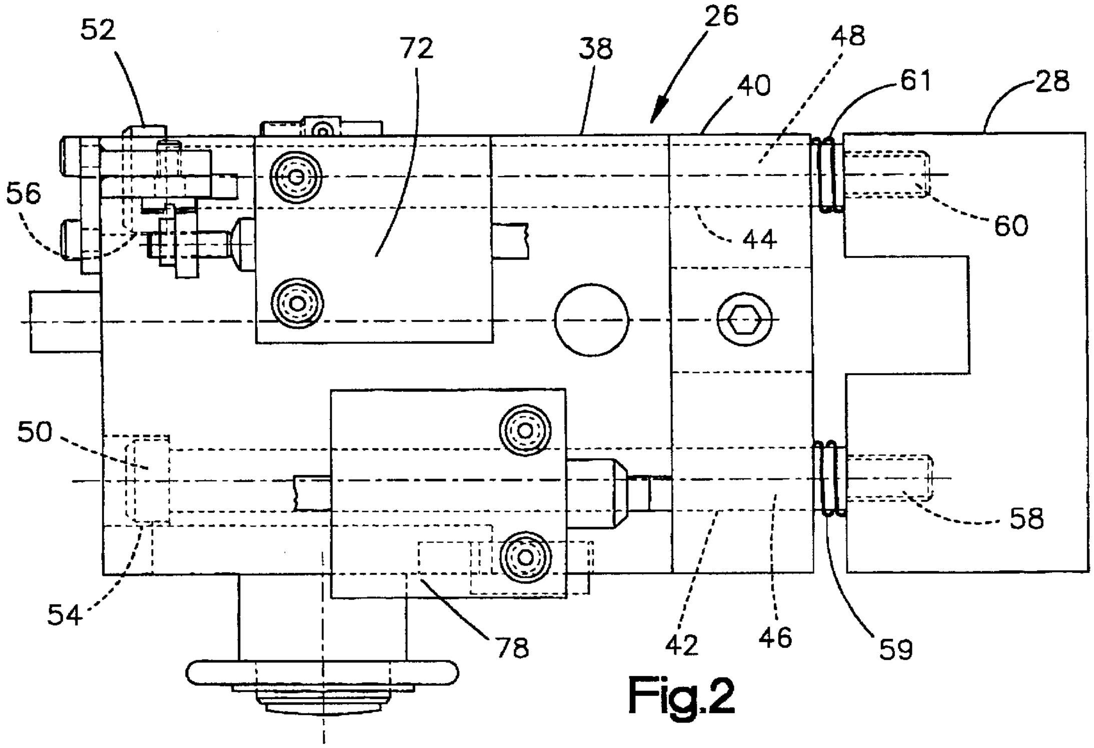
FIG. 2 is a top view of the clamp assembly of this invention.

A first microswitch 72 is positioned to sense the position of the clamp die holder and will notify the tube bender actuator controller if the clamp die holder 28 has moved toward the clamp die base 38. There are various ways to position the microswitch 72. In the embodiment of FIGS. 2 and 3, a projection 74 hits a contact 76 which keeps microswitch 72 in a normally closed position when the clamp die holder 28 is in the extended (normal) position as shown in FIG. 3. A swinging arm 77 holds the contact 76 in place and allows it to move rearward. Springs 59 and 61 bias the clamp die holder 28 in the normal position. Head 52 keeps arm 77 and contact 76 against switch 72. If the clamp die holder 28 is moved toward the clamp die base 38, rod 46 and 48 will move to the left (FIGS. 2, 3, 3A). The head 52 will release arm 77 and contact 76. Switch 72 will revert to the normally open position telling the tube bender controller actuator to stop the clamping sequence and to start the unclamping sequence.

A second microswitch 78 attached to the base 38 for convenience, senses when the clamp die holder is in the second position (FIG. 3A). Microswitch 78 is in a normally closed position when the spacer is in the first position. When the spacer moves to the second position, the second microswitch 78 opens. The closed position of switch 72 and open position of switch 78 tells the control that it is safe to proceed with the bending cycle. The controls and switches could be set up in alternate modes.

Figure 4:
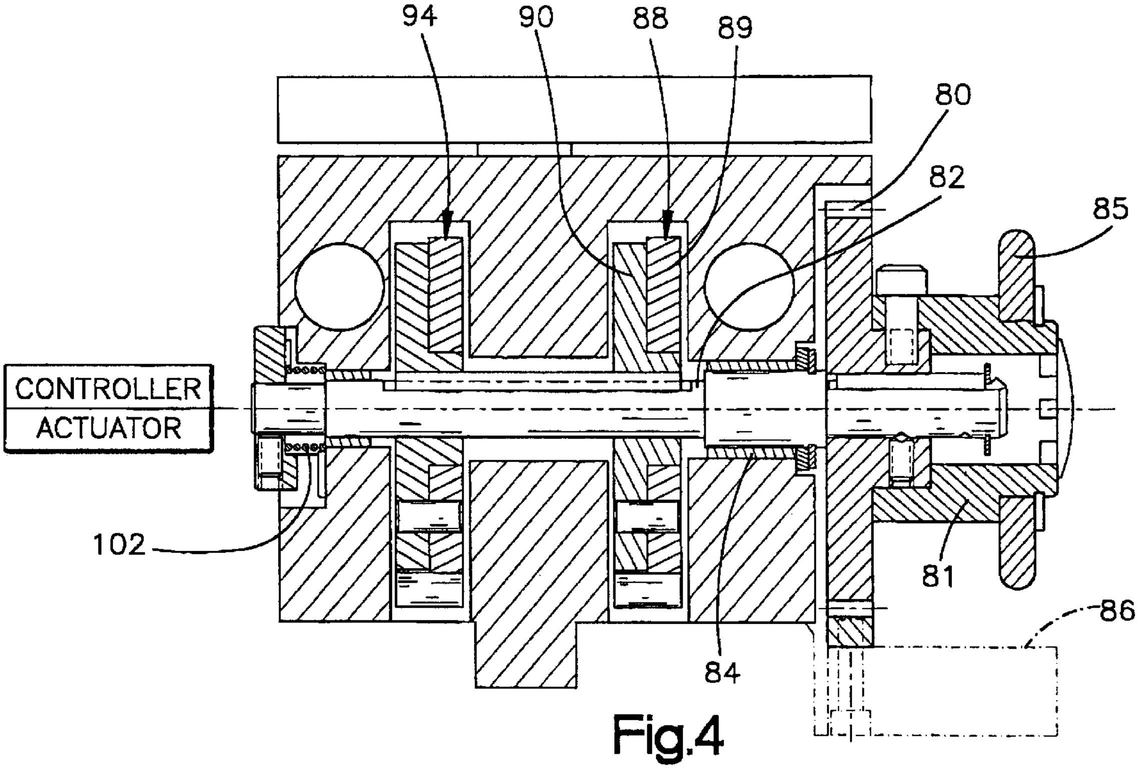
FIG. 4 is a section 4—4 of FIG. 3.

As shown in FIGS. 3–5, a gear 80 is rotatably attached to the base 38 by means of a shaft 82 held by a key 83. The shaft 82 is mounted in a bushing 84. A pull knob 85 is attached to the gear 80 by means of a sleeve 81. The structure of the gear 80, shaft 82 and pull handle is designed so that the gear handle can be used to pull the gear 80 off of and onto a rack 86 with teeth 87 on which the gear rides.

FIGS. 4 and 5 illustrate a first cam 88 formed of two plates 89 and 90. The plate 90 has a dowel pin 92 that travels in a slot 94 in plate 89. This arrangement permits plate 90, which is attached to the shaft 82, to drive the plate 89 only after the dowel pin 92 has moved the length of the slot. One plate normally allows movement of the spacer in one direction by means of one cam surface. The second plate allows or causes movement of the spacer in the other direction by means of a second cam surface. Since the plates 89 and 90 are rotatable relative to one and the other, the timing on the shaft 82 of the movement of the spacer 40 can be adjusted in both directions. This adjustment also permits adjustment of the safety spacing between the clamping die and the bend die as discussed later. The manufacturer sets this adjustment and not the user. It should be appreciated that the cam 88 could also be a single plate with different cam surfaces. A second cam 94 virtually identical to the first cam is also attached to the shaft 82.

As noted in FIG. 5, a cam follower 96 is mounted in proximity to the cam 88. One end 98 follows the contour of the cam and the other end 100 engages the end 43 of the spacer 40.

A third microswitch 101 (FIG. 3 and 3A) senses the position of the gear 80 relative to the rack 86. It signals if the gear 80 is either in contact or not in contact with the rack 86. The non engaged position of the gear and rack is accomplished by pulling on the pull knob 85. If this is done, the third microswitch 101 signals the controller and actuator that the machine is in the "set up" mode. That is, the tube or workpiece is being placed in the machine. During the set up mode, the clamp die holder can be moved freely on a slide (not shown) back and forth because the gear 80 is not engaged with the rack 86.

During set up the tube 24 is placed in the clamp die 22. That is, the pull knob 85 (FIGS. 3 and 4) is used to move the gear 80 off of the rack 86. The microswitch 101 disables the actuator for safety purposes. During the set up mode, a spring 102 (FIG. 4) will normally be connected to and rotate shaft 82 and cams 88 and 94 which move cam follower 96 and allows the spacer 40 to drop to the hard or second position.

After set up the gear 80 is reengaged with the rack 86 and the clamp die holder is moved away from the tube 24. This movement rotates the cams 88 and 94 and shaft 82 until the cam follower 96 has its one end 98 pushed down. The other end 100 of the follower 96 pushes up the spacer 40 to the "soft" or first position (FIG. 3). In this position, any pressure applied to the clamp die and thus the clamp die holder will compress the springs 59 and 61. Shafts 46 and 48 (FIG. 2) also move away from the tube and causes the projection 74 to lose contact with 76 (FIGS. 3 and 3A) which opens the first microswitch 72.

When the actuator and controller are told to bend the tubing, the clamp die holder 26 starts to close on the tube 24. The gear 80 is rotating clockwise (FIG. 3) on the rack 86 which turns the shaft 82 and cams 88 and 94. In the cams 88 and 94, one plate turns with the shaft until the dowel pin moves the other plate, then they move together. At a predetermined point, say ¼" spacing between the clamp die 22 and the bend die 18, cam 88 has rotated to a point where one end 98 of the cam follower 96 reaches the recess 104 and moves up (FIG. 5). Spring 68 is then free to move the spacer 40 downwardly to the hard or second position (FIG. 3A).

When the spacer 40 moves to the second position, the second microswitch 78 signals to the controller and actuator that the clamp die holder has fully engaged the tubing. Optionally, a 1/16" travel gap may be left for the clamp die holder to allow smooth movement of the spacer 40 without binding. In any event, the clamp die holder 26 continues its closing movement until the clamp die holder 28, the spacer 40 and the base 38 form a solid path to the tube 24 and thus forms the closed or hard or second position. In this second position, the first microswitch 72 is closed and the second microswitch 78 is open. These switches tell the controller that it is safe to proceed with the tube bending cycle.

A safety release mode automatically occurs if there is an obstruction, such as a person's finger between the clamp die and the bend die. The operation is as described above but the spacer 40 does not drop into place between the clamp die holder 28 and the base 38. If an obstruction is present, the clamp die holder 28 will start to move to the right but will stop when the obstruction is met and the springs 59 and 61 (FIG. 3), will be compressed. Alternately, one spring could be used. When the springs are compressed, the space between the clamp die 28 and base 38 will be too small for the spacer 40 to drop between them. If enough compression occurs, the top of the clamp die 28 will move under the end 41 and physically prohibit movement of spacer 40. The shafts 46 and 48 will also move rearwardly and open first microswitch 72 which immediately signals the controller to stop the clamping process and start the unclamp sequence. In this manner, both 1 mechanical and electrical safeguards prevent injury to an operator. Again, no action is required by the operator to trigger the safety mechanisms.

After the tube has been bent, an actuator moves the clamp die base 38 away from the tube 24 which turns the gear 80 counterclockwise. The gear 80 turns the cams via the shaft and the dowel pins in slots until the cam follower 96 forces the spacer back up to the first or soft clamp position.

While a preferred embodiment has been described with both safeguards, either the mechanical or electrical safeguard alone would prevent injury to operators. Moreover, various designs, shapes and movements of the spacer 40 could be utilized in this invention.

The present disclosure describes several embodiments of the invention, however, the invention is not limited to these embodiments. Other variations are contemplated to be within the spirit and scope of the invention and appended claims.

What is claimed is:

1. A clamp assembly, for holding a workpiece which will not fully engage if an obstruction is in the closure path and thus prevents injury to an operator, comprising:

a base;

a workpiece holder spaced from and movably attached to the base; and a spacer moveable between positions; a first position of the spacer allowing the workpiece holder to move in case the workpiece holder engages an obstruction; a second position of the spacer substantially blocking space between the workpiece holder and the base, thus making a substantially rigid connection between the workpiece holder and the base.

2. The clamp assembly of claim 1, wherein the workpiece holder is moveably attached to the base.

3. The clamp assembly of claim 2, wherein a first cam and a cam follower are attached to the base, the cam follower contacting both the first cam and the spacer so that when the cam is rotated, the cam follower permits the spacer to move to the second position.

4. The clamp assembly of claim 3, wherein the spacer is spring biased to the second position.

5. The clamp assembly of claim 2, wherein a gear is mounted to the base and operatively connected to a first cam, a rack outside of the base engages the gear so that as the base moves toward the workpiece, the gear turns the first cam which permits the spacer to move from the first position to the second position if there is no obstruction but to remain in the first position if there is an obstruction.

6. The clamp assembly of claim 5, wherein the spacer is spring biased to the second position and the workpiece holder is spring biased away from the base.

7. The clamp assembly of claim 2, wherein the workpiece holder moves toward the base and engages the. spacer if an obstruction is present and prevents the spacer from moving to the second position.

8. The clamp assembly of claim 2, wherein a microswitch senses the position of the spacer and stops operation of an attached machine if the spacer remains in the first position when the clamp assembly has engaged the workpiece.

9. The clamp assembly of claim 6, wherein the gear is moveable to a position that does not engage the rack, the cam is operatively attached to the gear and a spring is attached to the shaft which rotates the cam to move so that the workpiece may be set up.

* * * * *